United States Patent [19]

Gantzer

[11] Patent Number: 5,146,737
[45] Date of Patent: Sep. 15, 1992

[54] FARM MACHINE HAVING A PROTECTED JOINT PERMITTING ROTATION BETWEEN TWO ELEMENTS

[75] Inventor: Jean-Paul Gantzer, Lutzelbourg, France

[73] Assignee: Kuhn, S.A., Saverne Cedex, France

[21] Appl. No.: 710,771

[22] Filed: Jun. 5, 1991

[30] Foreign Application Priority Data

Jun. 6, 1990 [FR] France ............................ 90 07208

[51] Int. Cl.⁵ .......................................... A01D 34/00
[52] U.S. Cl. ............................. 56/14.9; 56/DIG. 14
[58] Field of Search ............ 56/14.9, 15.3, DIG. 14; 280/476.1

[56] References Cited

U.S. PATENT DOCUMENTS

| | | | |
|---|---|---|---|
| 2,612,763 | 10/1952 | Hansen | 64/3 |
| 3,266,818 | 8/1966 | Hill | 280/478 |
| 3,837,677 | 9/1974 | Haskins | 280/476 R |
| 5,025,616 | 6/1991 | Moss | 56/14.9 |
| 5,094,063 | 3/1992 | Wattron et al. | 56/14.9 X |

FOREIGN PATENT DOCUMENTS

| | | |
|---|---|---|
| 1092245 | 11/1960 | Fed. Rep. of Germany . |
| 1184135 | 12/1964 | Fed. Rep. of Germany . |
| 3701369 | 7/1988 | Fed. Rep. of Germany . |
| 2142103 | 1/1973 | France . |
| 2013830 | 8/1979 | United Kingdom . |

Primary Examiner—Thuy M. Bui
Attorney, Agent, or Firm—Oblon, Spivak, McClelland, Maier & Neustadt

[57] ABSTRACT

A farm machine includes first and second elements connected to each other through a joint which permits a rotation between the first and second elements. The farm machine also includes a stop member for limiting the rotation between the first and second elements and a protective device for isolating the stop member which is not deformed during the rotation of the first and second elements.

14 Claims, 5 Drawing Sheets

FARM MACHINE HAVING A PROTECTED JOINT PERMITTING ROTATION BETWEEN TWO ELEMENTS

BACKGROUND OF THE INVENTION

1. Field of the Invention

The present invention relates to a farm machine comprising two elements connected to one another by a joint for allowing a rotation between the elements, the rotation being limited in at least one direction by a stop means intended to come into contact with one of the elements.

2. Description of the Related Art

A pulled mower which is to be hitched to a tractor is known in the related art.

The known mower consists of a tongue and a frame. The frame extends crosswise to the direction of advance at work and is equipped at each of its longitudinal ends with a wheel by which it rests on the ground. The frame supports a harvesting mechanism whose driving is performed from the power takeoff of the tractor which drives, by several successive telescopic shafts with universal joints, the input shaft of the harvesting mechanism. The tongue consists of a primary tongue intended to be hitched to the lower arms of the hitch of the tractor and a secondary tongue connected to the frame. The primary tongue is connected to the front end of the secondary tongue by a yoke with a vertical pin, which allows a rotation of the primary tongue relative to the secondary tongue during the driving of the tractor. The yoke, connected to the primary tongue, comprises two stops intended to come into contact with the secondary tongue. Each of these stops thus limits the rotation of the primary tongue relative to the secondary tongue to an acceptable value for the telescopic shafts with universal joints used to drive the harvesting mechanism. As a result, the driving of the harvesting mechanism can be performed safely during difficult maneuvers.

In practice, however, it has been proven that these stops were jamming zones where the user runs the risk of injuring himself. Actually, during the hitching or the depositing of the mower, the user is often led to pivot the primary tongue manually, either to orient the latter relative to the hitching arm of the tractor or to move the mower manually. Under these conditions, the user runs the risk of injuring himself by jamming his hand between a stop and the secondary tongue.

In a more general way, these jamming zones, where the user runs the risk of injuring himself, exist between two elements connected to one another by a joint allowing a rotation between the elements, this rotation being limited in at least one direction by a stop intended to come into contact with one of the elements.

SUMMARY OF THE INVENTION

Accordingly, an object of the present invention is to provide for a novel farm machine in which the risk of injury to a user is eliminated.

For this purpose, the farm machine according to the present invention is characterized by the fact that a protective device isolating the stop means and not being deformed during the rotation is provided.

In such an arrangement, the jamming zone is kept outside of the reach of the user so that he no longer rungs the risk of injuring himself. Moreover, since the protective device is not deformed during rotation, it isolates the stop means, or the jamming zone in a more effective way, making it possible for the user to handle his machine safely.

According to a further object of the present invention, it is provided that the stop means is connected to the first element and that it is intended to come into contact with the second element. The protective device can be connected to the second element.

In such a solution, it is also provided that the rotation between the elements is limited in the two directions by a respective stop means. Advantageously, each stop means can be formed by a longitudinal end of a support of stops. A particularly advantageous solution is obtained when the support of stops is a cylinder portion centered at least approximately on the geometric axis of the joint. This makes it possible for the corresponding end of the second element to rotate freely in the cavity of the cylinder portion without preventing the stop means of each longitudinal end from coming into contact with the second element.

According to a further object of the present invention, it is provided that the protective device which isolates the stop means comprises a cylinder portion centered at least approximately on the geometric axis of the joint. Moreover, this cylinder portion is connected at each of its two longitudinal ends to the second element. A particularly advantageous solution can be obtained by connecting the protective device to the second element by bolts. As a result, the protective device surrounds, in a removable way, the stop means intended to come into contact with the second element.

In a particularly advantageous embodiment, it is provided that the protective device in addition comprises a cover.

In a further embodiment, it is provided that the first element comprises a yoke between the flanges from which extend at least partially, the second element, the support of stops and the protective device.

According to a further characteristic of the present invention, it is provided in an embodiment that one of the elements is a primary tongue and that the other element is a secondary tongue. In an additional embodiment, one of the elements can be a tongue and the other a part of the body of the farm machine. These embodiments obviously are nonlimiting.

Accordingly, the present invention relates to a farm machine comprising first and second elements connected to each other through a joint, the joint permitting a rotation between the first and second elements; stop means intended to come into contact with one of the first and second elements in order to limit the rotation between the first and second elements in at least one direction; and a protective device for isolating the stop means, the protecting device not being deformed during the rotation between the first and second elements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
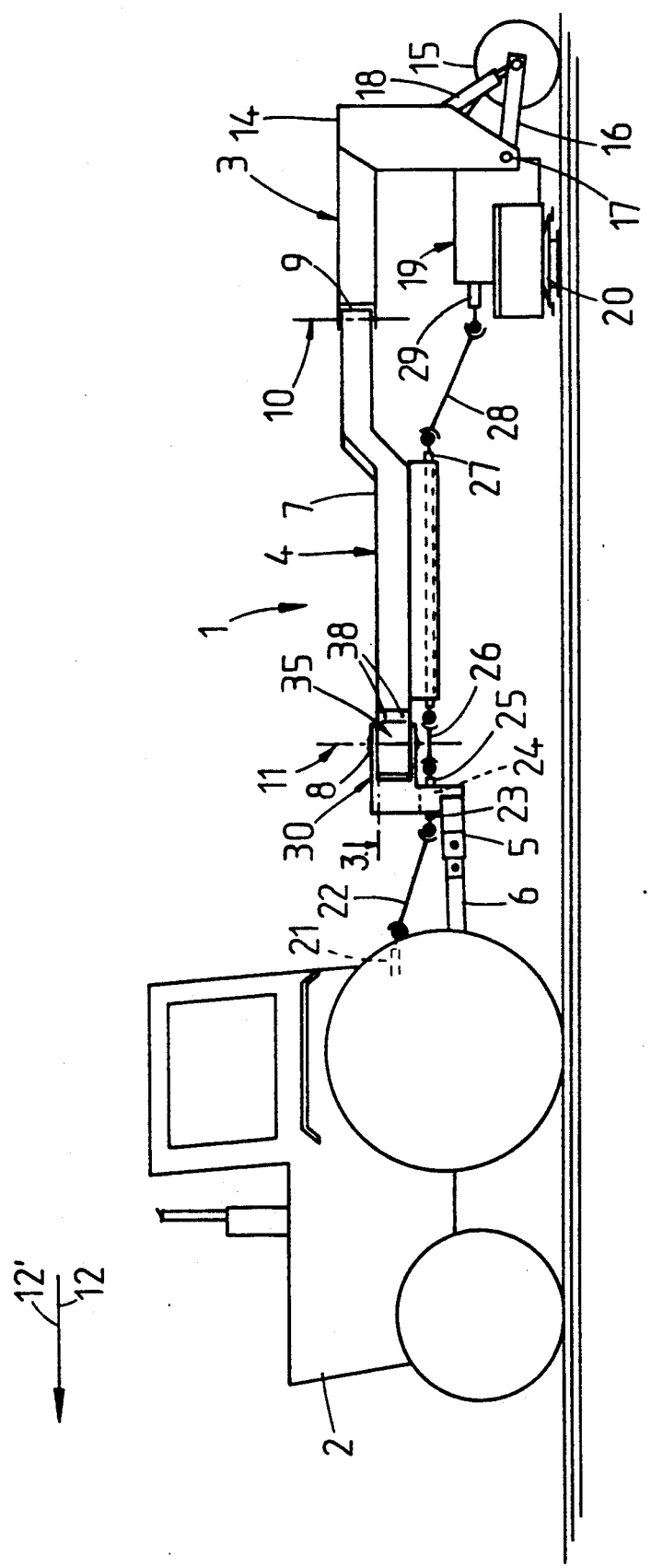
FIG. 1 represents a side view of a farm machine according to the invention hitched to a farm tractor.
Figure 2:
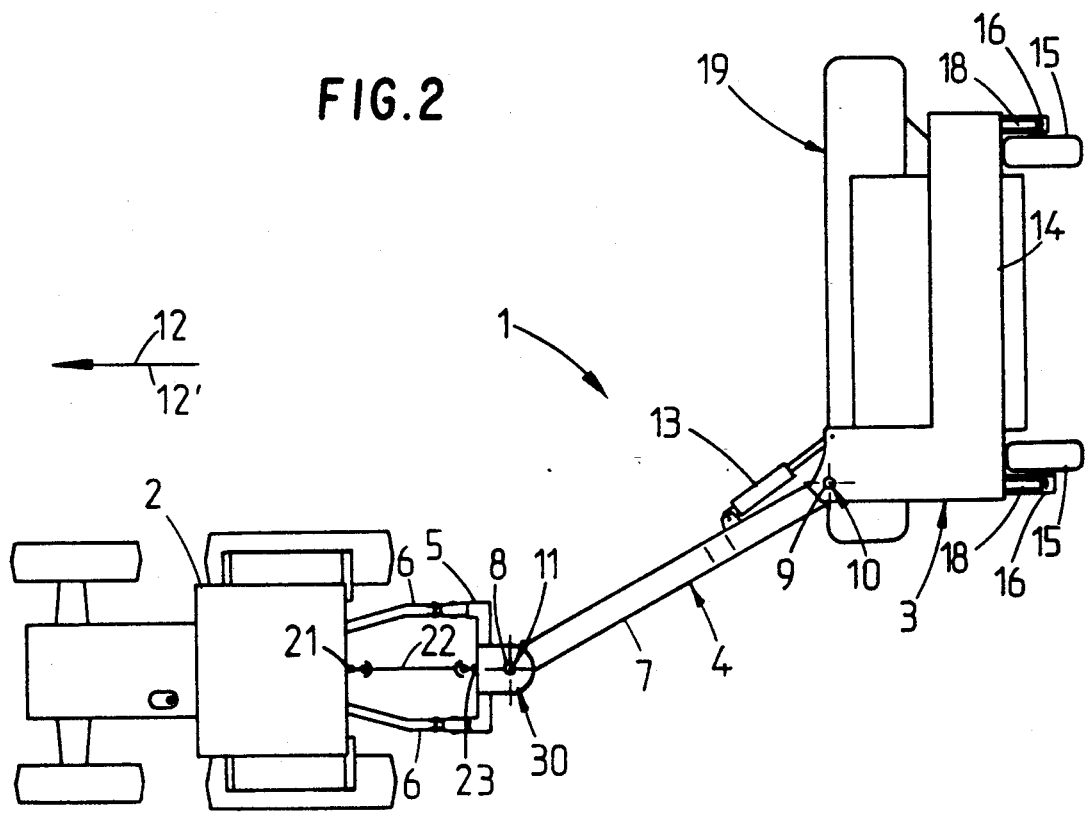
FIG. 2 represents a top view of the farm machine hitched to the farm tractor.

FIGS. 1 and 2 shows a mower (1) according to the invention. The mower is hitched to a farm tractor (2).

The mower (1) comprises a body (3) and a tongue (4). Tongue (4) comprises a primary tongue (5) intended to be hitched to lower arms (6) of the hitch of farm tractor (2) and a secondary tongue (7) connected to body (3) of mower (1). Primary tongue (5) is connected at the front end of secondary tongue (7) by a joint (8) which allows, in this embodiment according to the invention, a pivoting of primary tongue (5) relative to secondary tongue (7) around a geometric axis (11) directed upward. Body (3) of mower (1) extends crosswise to direction of advance (12) at work. Body (3) is connected more precisely near one of its longitudinal ends to the rear end of secondary tongue (7) by a joint (9) with geometric axis (10) at least approximately vertical. The angular position of tongue (4) relative to body (3) can be modified by making secondary tongue (7) pivot around geometric axis (10) of joint (9). The desired angular positioning and the process of keeping it in the latter are achieved by a hydraulic cylinder (13). Due to this arrangement, body (3) of mower (1) can extend, in this embodiment—as seen from the rear in direction of advance (12) at work—either to the right, or in the extension of farm tractor (2). This allows, for example, the mowing to the right of farm tractor (2) or the transport in the extension of the latter.

Body (3) of mower (1) comprises a frame (14) which rests on the ground—in particular at work—by two wheels (15) which each extend near a respective outside end of the frame (14). Each wheel (15) is connected to frame (14) by a wheel arm (16) itself connected to the frame (14) by a joint of the pivot type (17) with geometric axis directed at least approximately perpendicular to the direction of advance (12) at work. The geometric axes of joints (17) of the two wheels (15) are at least approximately merged. Between each wheel arm (16) and frame (14) is further provided a hydraulic cylinder (18) which makes it possible to make wheel arm (16) and corresponding wheel (15) pivot relative to frame (14) around the geometric axis of corresponding joint (17). This makes it possible for the frame (14) to be brought close to the ground during the mowing phase and to be moved away from the ground when the mowing is interrupted.

Moreover, body (3) of mower (1) comprises a group of working elements which consists of a harvesting mechanism (19) equipped with cutting elements (20) and handling elements (not shown) of the product cut by cutting elements (20).

The driving of harvesting mechanism (19) is achieved from power takeoff (21) of farm tractor (2) which drives, by a telescopic shaft with universal joints (22), input shaft (23) of a movement transmission device (24) connected to primary tongue (5). Output shaft (25) of movement transmission device (24) is oriented in direction of advance (12') of farm tractor (2) and drives, by another telescopic shaft with universal joints (26), transmission shaft (27). The latter extends under secondary tongue (7) in an approximately parallel way to the secondary tongue (7). Further, the longitudinal axis of transmission shaft (27) a well as the longitudinal axis of output shaft (25) of movement transmission device (24) and geometric axis (11) of joint (8) are at least approximately concurrent. This arrangement makes it possible for the telescopic shaft with universal joints (26), which is located under the joint (8) and whose joints are equidistant from corresponding geometric axis (11), to drive transmission shaft (27) in a homokinetic way. The latter transmits, by another telescopic shaft with universal joints (28), the movement of rotation to input shaft (29) of harvesting mechanism (19). In a work position (FIGS. 1 and 2), i.e., when mower (1) extends—as seen from the rear—to the right of farm tractor (2), transmission shaft (27) is oriented at least approximately parallel to input shaft (29) of harvesting mechanism (19). This makes it possible to drive cutting elements (20) and the handling elements of the cut product in an approximately homokinetic way.

Figure 3:
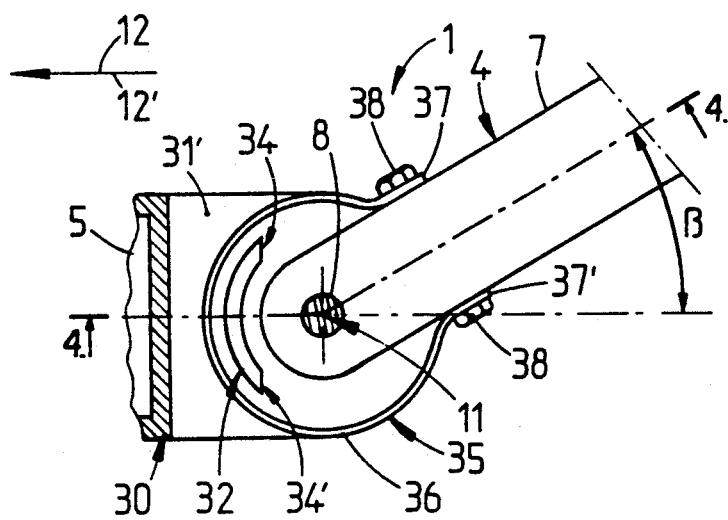
FIG. 3 represents a partial section of the primary tongue along plane III—III of FIG. 1.
Figure 4:
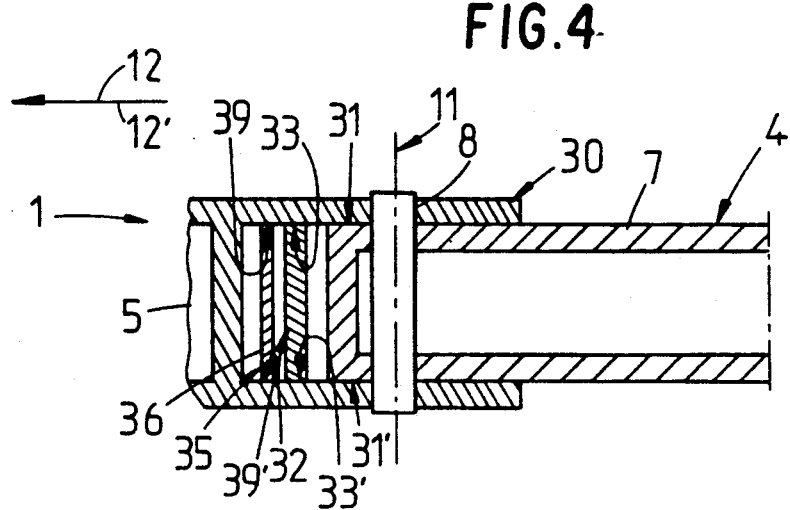
FIG. 4 represents a section (along surface plane IV—IV of FIG. 3) of a part of the tongue.
Figure 5:
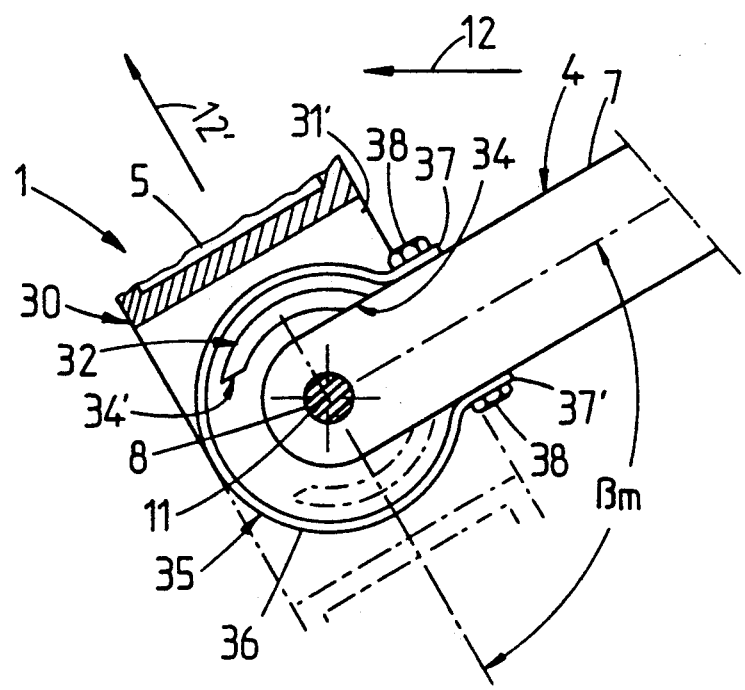
FIG. 5 represents, along plane III—III of FIG. 1, the end positions of the primary tongue relative to the secondary tongue.

FIGS. 3, 4 and 5 show in detail the connection of primary tongue (5) with secondary tongue (7). In these figures it is shown that primary tongue (5) comprises a yoke (30) whose flanges (31, 31') are directed at least approximately horizontally toward the rear relative to the direction of advance (12') of farm tractor (2). In particular, the front end of secondary tongue (7), through which pivot pin (8) of yoke (30) passes, extends between these flanges (31, 31'). A support of stops (32), consisting of a cylinder portion centered on geometric axis (11) of joint (8), also extends between flanges (31, 31') of yoke (30). This support of stops (32) is connected by each face (33, 33'), delimiting its height, to a respective flange (31, 31') of yoke (30) (FIG. 4). Further, FIGS. 3 and 5 illustrate that the support of stops (32) comprises at each of its longitudinal ends a respective stop (34, 34'), intended to come into contact with secondary tongue (7). Such an arrangement makes it possible to limit an angle of rotation (β), existing between output shaft (25) of transmission device (24) and transmission shaft (27) of secondary tongue (7), to a supportable value for telescopic shaft with universal joints (26) extending under joint (8). In this way, during a tight turn—to the right or to the left—one of the stops (34, 34') of the support of stops (32) of primary tongue (5) comes to rest against secondary tongue (7), thus limiting the angle of rotation of primary tongue (5) around geometric axis (11) of joint (8) to a maximum angle of rotation (β m).

To prevent the user from injuring himself during maneuvers of hitching or depositing mower (1), a protective device (35), which is not deformed during the rotation, isolates stops (34, 34'). For this purpose, protective device (35) comprises a cylinder portion (36) centered on geometric axis (11) of joint (8), having a length and a radius greater than those of support of stops (32). Longitudinal ends (37, 37') of cylinder portion (36) of protective device (35) are each mounted, in a rigid but nevertheless removable way, on a respective lateral face of secondary tongue (7). As shown in FIGS. 1, 3 and 5, this connection is assured by two corresponding bolts (38) which connect each longitudinal end (37, 37') of protective device (35) to secondary tongue (7). In addition, the cylinder portion (36) is as high as the support of stops (32), so that each respective face (39, 39'), delimiting the height of the cylinder portion (36), joins a corresponding flange (31, 31') of yoke (30), thus isolating the support of stops (32) inside a section which is cylindrical as a whole. As a result, protective device (35), which rotates with secondary tongue (7) relative to primary tongue (5), completely surrounds stops (34, 34'), whatever the angular position—allowed by the stops (34, 34')—of primary tongue (5) may be relative to secondary tongue (7).

Figure 6:
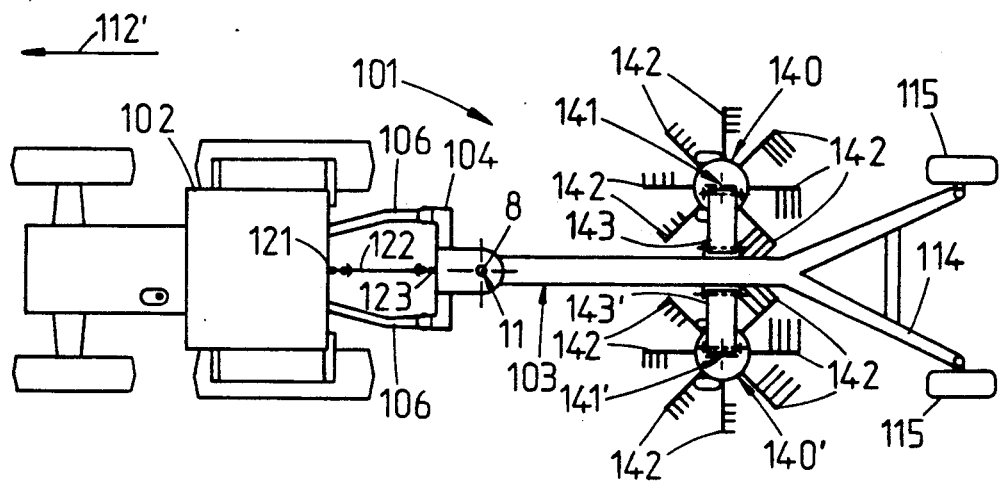
FIG. 6 represents a top view of another farm machine according to the invention hitched to a farm tractor.
Figure 7:
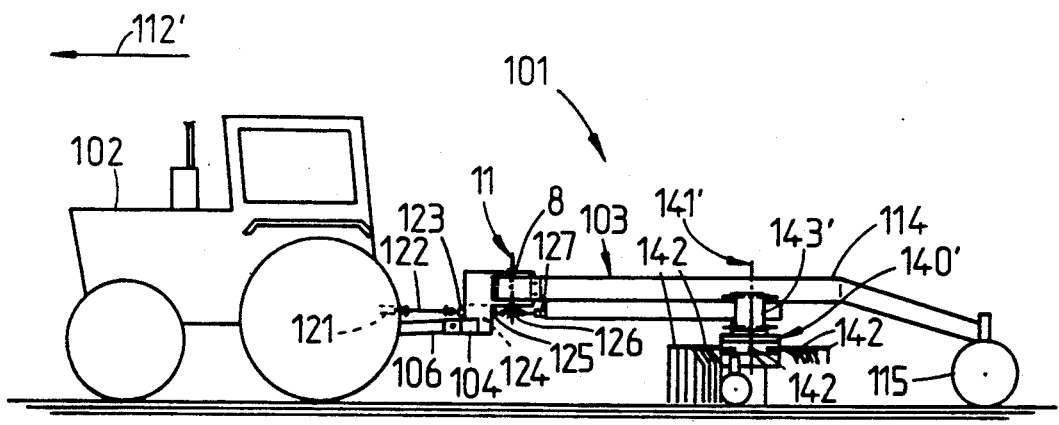
FIG. 7 represents a side view of the farm machine of FIG. 6 hitched to the farm tractor.

FIGS. 6 and 7 show a further embodiment of a farm machine according to the present invention. In this example, the farm machine is a windrower (101) hitched to a farm tractor (102).

The farm machine comprises a frame (114) which extends parallel to the direction of advance at work and which is supported at the rear by two wheels (115). At its front end, frame (114) is connected to a tongue (104) by a joint (8) identical with that of mower (1) described above, which allows a pivoting of tongue (104) relative to frame (114) along a geometric axis (11) directed upward. Tongue (104) is intended to be hitched to lower arms (106) of the hitch of the farm tractor (102). A rotor (140, 140'), whose geometric axis of rotation (141, 141') is directed upward and which is equipped at its periphery with fork arm (142) intended to windrow the hay, extends on both sides of frame (114). The connection of each rotor (140, 140') with frame (114) is achieved by a corresponding connecting arm (143, 143'), making possible an individual adaptation of rotors (140, 140') to the contour of the terrain. Windrower (101) can thus bring the hay from in front of the rotors (140, 140') to the center of the rotors (140, 140') to constitute a windrow. Frame (103) equipped with wheels (115) and supporting the two rotors (140, 140') by respective connecting arms (143, 143') constitutes body (103) of windrower (101).

In a way similar to the preceding embodiment, the driving of rotors (140, 140') is achieved from power takeoff (121) of farm tractor (102) which drives, by a telescopic shaft with universal joints (122), input shaft (123) of a movement transmission device (124) connected to tongue (104). Output shaft (125) of movement transmission device (124) is also oriented in direction of advance (112') of farm tractor (102) and drives, by a telescopic shaft with universal joints (126) arranged identically with that of the preceding example, a transmission shaft (127). The latter extends under frame (114) in an approximately parallel way to the frame (114) and is coupled with a bevel gear device (not shown) which drives, by a corresponding telescopic shaft with universal joints (not shown), each rotor (140, 140').

The connection of tongue (104) with frame (114) is identical by its shape with that described between primary tongue (5) and secondary tongue (7) in the preceding embodiment. Support of stops (32) and protective device (35) are also identical by their shape with those of mower (1) described above. For this reason, none of these elements will be described again.

Figure 8:
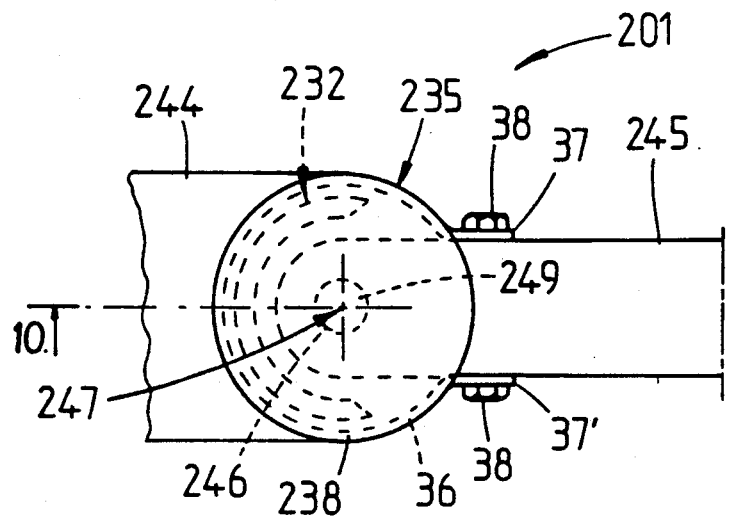
FIG. 8 represents a connection between two elements of another farm machine according to the invention.
Figure 9:
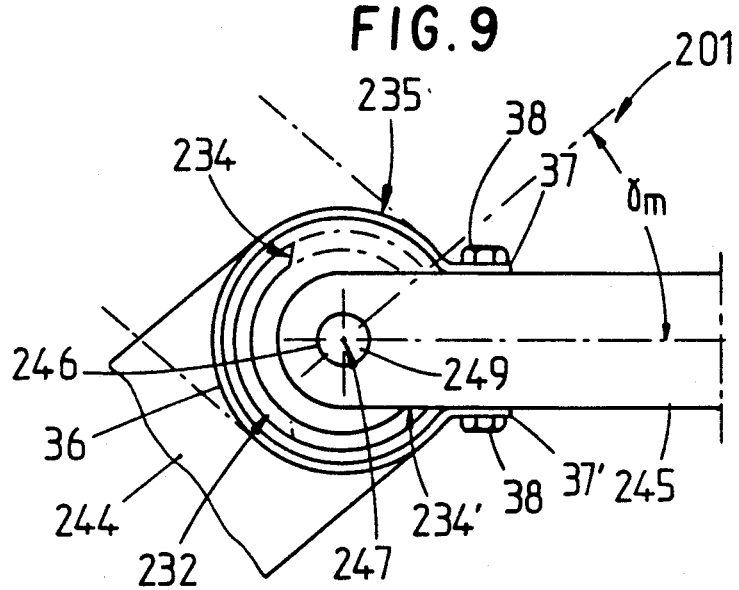
FIG. 9 represents, without cover, the end positions of one element (of the connection of FIG. 8) relative to the other.
Figure 10:
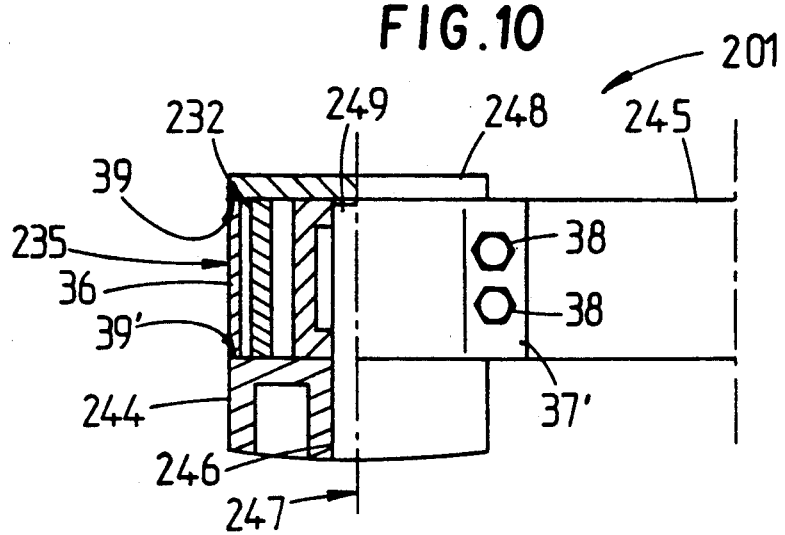
FIG. 10 represents a partial section (along plane X—X of FIG. 8) of the connection.

FIGS. 8, 9 and 10 show two elements (244, 245) of a further embodiment of a farm machine (201) according to the present invention.

The two elements (244, 245) are connected to one another by a joint (246) with geometric axis (247) allowing a rotation between the elements (244, 245). The joint (246) is made through a journal (249) connected rigidly at one of its two longitudinal ends to the second element (245) and being connected at its other longitudinal end to the first element (244). Further, first element (244) comprises a support of stops (232) comprising a cylinder portion centered on the geometric axis (247). The support of stops (232) comprises at each of its longitudinal ends a respective stop (234, 234'), intended to come into contact with the second element (245). Such an arrangement makes it possible, as described in the preceding embodiments, to limit the angle of rotation between the two elements (244, 245) to a maximum angle of rotation ($\gamma m$).

In this embodiment according to the present invention, a protective device (235) isolates, as in the preceding embodiments, support of stops (232). This protective device (235) comprises a cylinder portion (36) and bolts (38) identical by their shape and their arrangement with those described in the preceding examples. In addition, protective device (235) comprises a cover (248) which is connected to face (39) delimiting the height of cylinder portion (36). As a result, protective device (235) equipped with its cover (248) completely surrounds stops (234, 234').

Finally, various modifications are possible in particular concerning the composition of various elements or by substitution of equivalent techniques, without thereby going outside the field of protection defined by the claims. Thus, in particular in the embodiments described, it is perfectly possible to replace cylindrical connection (8; 108; 246) or/and support of stops (32; 32; 232) or/and protective device (35; 35; 235) by elements of different shapes and more particularly by elements of spherical shape.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A farm machine comprising:
   first and second elements connected to each other through a joint, said joint permitting a rotation between said first and second elements;
   stop means intended to come into contact with one of said first and second elements in order to limit the rotation between said first and second elements in at least one direction; and
   a protective device for isolating said stop means, said protective device not being deformed during the rotation between said first and second elements.

2. The farm machine according to claim 1, wherein said stop means is connected to said first element and intended to come into contact with said second element.

3. The farm machine according to claim 1, wherein said protective device is connected to second element.

4. The farm machine according to claim 3, wherein the rotation is limited in two directions by a respective stop means.

5. The farm machine according to claim 4, wherein said stop means is formed by a longitudinal end of a support of stops.

6. The farm machine according to claim 5, wherein said support of stops is a cylinder portion centered at least approximately on an axis of said joint.

7. The farm machine according to claim 5, wherein:
said stop means is connected to said first element and intended to come into contact with said second element; and
said first element comprises a yoke between the flanges from which extend at least partially, said second element, said support of stops and said protective device.

8. The farm machine according to claim 1, wherein said protective device comprises a cylinder portion centered at least approximately on the geometric axis of said joint.

9. A farm machine according to claim 8, wherein said protective device is connected to said second element by bolts.

10. The farm machine according to claim 8, wherein said protective device comprises a cover.

11. The farm machine according to claim 8, wherein said cylinder portion is connected at each of its two longitudinal ends to said second element.

12. The farm machine according to claim 1, wherein one of said first and second elements is a primary tongue and the other of said first and second elements is a secondary tongue.

13. The farm machine according to claim 12, wherein said primary tongue is adapted to be hitched to a farm tractor and said secondary tongue is adapted to be hitched to a body of said farm machine.

14. The farm machine according to claim 1, wherein one of said first and second elements is a tongue and the other of said first and second elements is a part of a body of the farm machine.

* * * * *